Nov. 3, 1931.  E. GOLDBERG  1,830,602
DISTANCE RELEASING DEVICE FOR MOVING PICTURE CAMERAS
DRIVEN BY A SPRING MECHANISM
Filed Jan. 25, 1927   3 Sheets-Sheet 1

Inventor:
Emanuel Goldberg
By William C. Linton
Attorney

Nov. 3, 1931.   E. GOLDBERG   1,830,602
DISTANCE RELEASING DEVICE FOR MOVING PICTURE CAMERAS
DRIVEN BY A SPRING MECHANISM
Filed Jan. 25, 1927   3 Sheets-Sheet 2
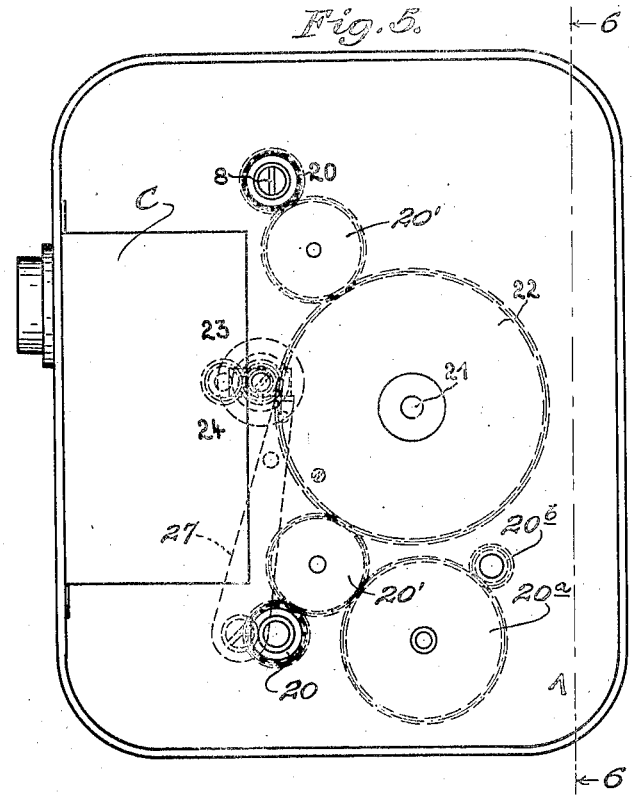
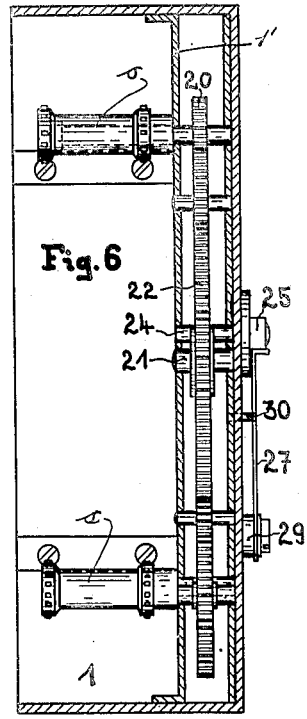
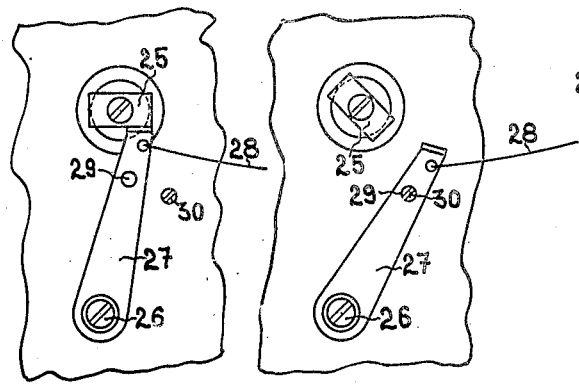
Fig.7   Fig.8
Inventor:
Emanuel Goldberg
By William C. Linton
Attorney.

Nov. 3, 1931.  E. GOLDBERG  1,830,602
DISTANCE RELEASING DEVICE FOR MOVING PICTURE CAMERAS
DRIVEN BY A SPRING MECHANISM
Filed Jan. 25, 1927  3 Sheets-Sheet 3

Inventor
Emanuel Goldberg
By William C. Linton
Attorney

Patented Nov. 3, 1931

1,830,602

UNITED STATES PATENT OFFICE

EMANUEL GOLDBERG, OF DRESDEN, GERMANY

DISTANCE RELEASING DEVICE FOR MOVING PICTURE CAMERAS DRIVEN BY A SPRING MECHANISM

Application filed January 25, 1927, Serial No. 163,489, and in Germany January 21, 1926.

This invention relates to improvements in cameras of that type capable of photographing motion or still pictures at the option of the user, having for a salient object, to provide a camera wherein a film driving or feeding mechanism is employed for moving the film strip by the camera lens, means being inserted for controlling the operation of said mechanism as may be required by a user merely by simple adjustment of conveniently arranged control devices and if desirable, allowing such mechanism to be manually operated both for the photographing of motion and still pictures.

It is also an object of the invention to provide the camera with means for permitting the remote control of the film feeding mechanism whereby the same may be started or stopped by a user in a manner which will permit said user to position himself as a subject to be photographed and when so positioned, effect elective operation of the camera.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of my invention.

Figure 1:
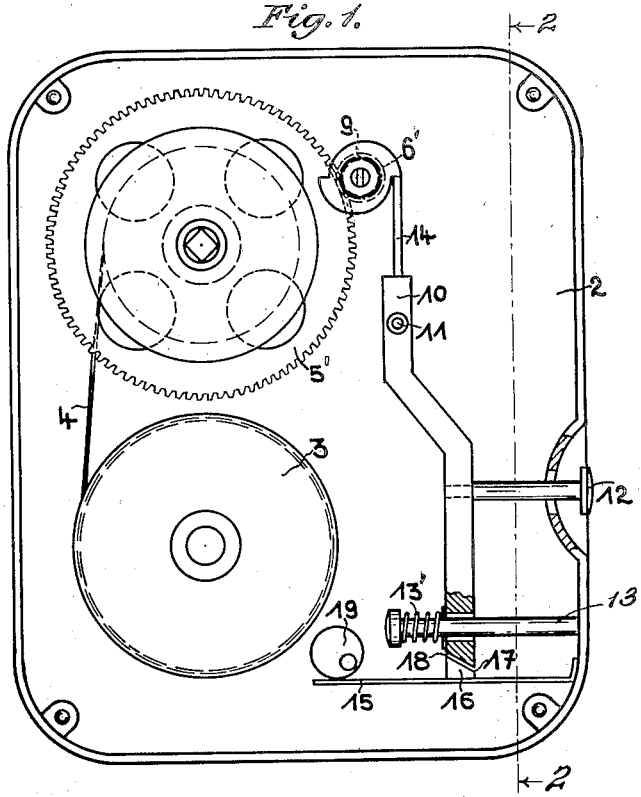
Figure 2:
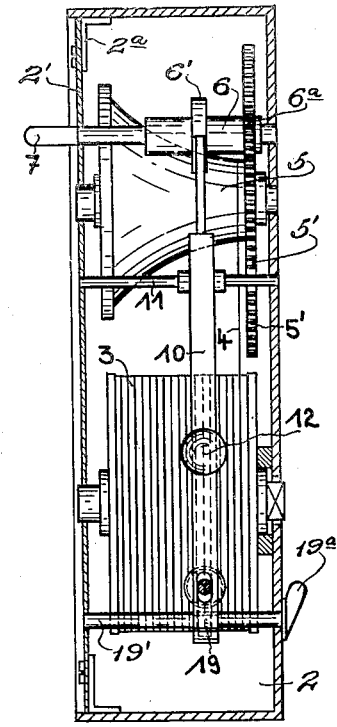
Figure 3:
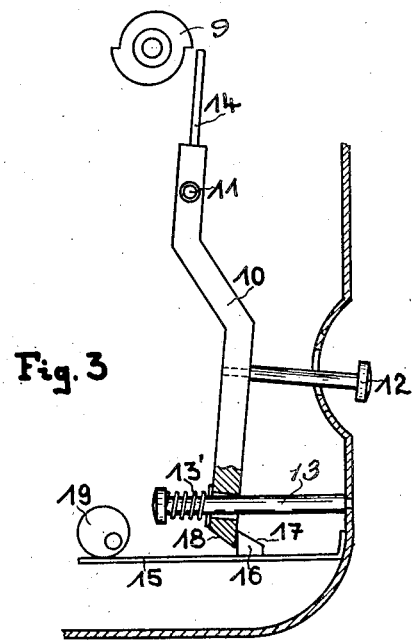
Figure 4:
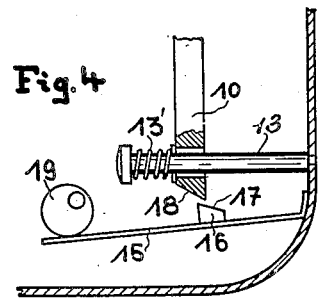
Figure 10:
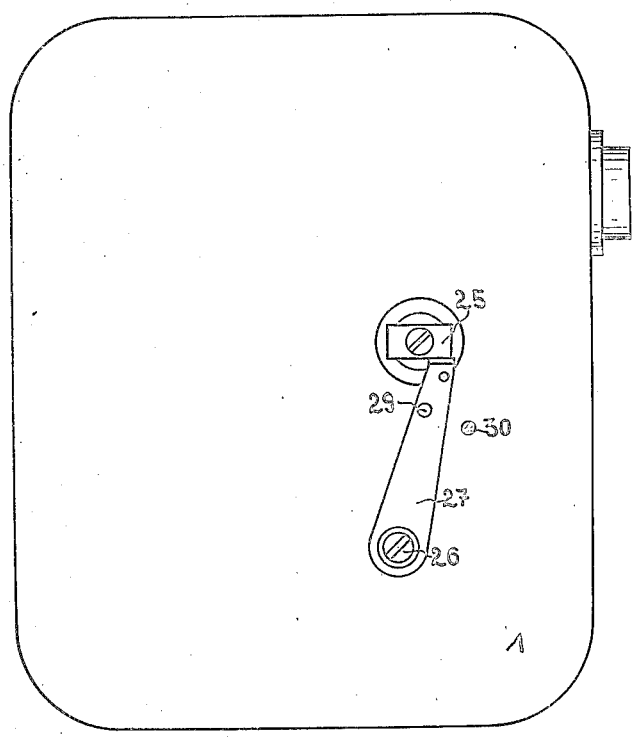
Figure 11:
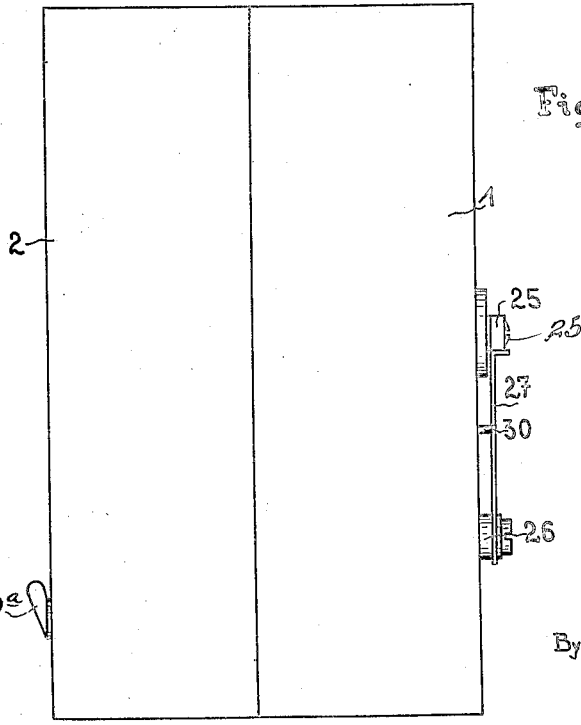

In these drawings:

Figure 1 is an inner side elevation of one section of the camera showing the arrangement of the film strip starting or feeding motor, Figure 2 is a vertical transverse section taken on the line 2—2 of Figure 1 looking in the direction in which the arrows point, Figure 3 is a fragmentary detail in vertical section through a portion of the camera illustrating the local control means therefor, Figure 4 is a similar view of the manually operable means for releasing the local control means, Figure 5 is an inner side elevation of the remaining or opposite section of the camera illustrating the arrangement of the camera proper and the train of gearing employed to transmit motion to the film feeding sprockets, Figure 6 is a vertical transverse section taken on the line 6—6 of Figure 5, looking in the direction in which the arrows point, Figure 7 is a fragmentary detail in elevation of the remote control device showing it in an engaged position, Figure 8 is a similar view wherein the remote control device is in a disengaged position, Figure 9 is a fragmentary detail in vertical transverse section through the remote control device showing its connection with the driving pinion, Figure 10 is a side elevation of the camera illustrating the arrangement of the remote control device thereupon, and Figure 11 is a similar view taken at substantially right angles to the Figure 10 illustrating the arrangement of the remote control device upon the camera casing and the release device for the local control of the film feeding mechanism.

Having further reference to the drawings, in connection with which like characters of reference will designate corresponding parts throughout, the improved camera may be stated to comprise sheet metal casing sections designated by the numerals 1 and 2, each of such sections being equipped with means, not shown herein, whereby they may be secured in juxtaposed relation as is shown in the Figure 11.

In the casing section 2 a spring drum 3 is rotatably mounted and has coiled thereabout a wire belt 4, the outer or free end of which is adapted to be engaged with a driving pulley 5 also rotatably mounted in said casing and arranged directly above but in spaced relation to the spring drum 3.

A sleeve 6 having a cam like latching element 6' fixedly mounted thereupon is rotatably positioned in proximity to the driving pulley 5, and carries a pinion 6a upon one end thereof adapted to mesh with a gear 5' secured to the reduced end of the driving pulley 5 so that with the imparting of rotary motion to the latter from the wire belt 4 connected to its peripheral portion and extended into engagement with the spring drum 3, rotary motion will be transmitted thereto. Also, in this connection, it will be noted that an extension 7 is provided upon one end of the shaft supporting the sleeve 6 and that this extension affords means for effecting a rotary driving connection as between the sleeve 6 and the film strip feeding mechanism, hereinafter more fully described.

With a view toward providing means for permitting of selective control of rotation of the driving pulley 5, a latch arm 10 is provided, said arm being arranged within the camera casing section 2 and pivoted with respect to the same as indicated by the numeral 11; the lower end of the arm carrying a laterally or right angularly disposed finger thrust device 12 having the outer end thereof headed in a suitable manner and extended through an opening formed in an appropriate portion of the section 2 as is clearly indicated in the Figure 1. Thus, by pushing the device 12 inwardly, rocking movement will be imparted to the latch arm 10, and that the said latch arm might be secured in an adjusted position at the extreme of one of its movements, a guide pin 13 is fixedly supported upon a portion of the casing 2 and extends through an opening formed in the adjacent and lower end of the latch arm 10 having a coiled spring 13′ engaged about that extremity of the same extended beyond the latch arm, which spring has bearing upon the headed inner end of the guide pin and upon an adjacent portion of said latch arm 10, that in its normal position, this latch arm will assume that position as is shown in the Figure 1. A pawl 14 is fixedly mounted upon the upper or remaining end of the latch arm 10 and is so disposed as to be engageable, at times, with the teeth of the cam latch 6′, hereinbefore described. Hence, it will be understood that with engagement of the pawl 14 with the teeth or shouldered portions of the cam latch 6′, the sleeve 6 carrying it will be prevented from having rotary movement and in this way, rotation of the driving pulley 5 under influence of the spring drum 3 and the wire belt 4 may be controlled at will by a user of the camera.

That the latch arm 10 may be secured in its innermost position with the imparting of a thrust to the device 12, a spring arm 15 is mounted in the lower portion of the camera casing section 2 and carries upon the upper side of its intermediate portion a bevel latch element 16, this bevel portion indicated by the numeral 17 corresponding with the beveled lower end 18 of the latch arm 10. Thus, with the inward pivotal movement of the latch arm 10 to the extreme of its adjusting movement under influence of the device 12, the beveled portion 18 of the latch arm 10 will ride over the beveled portion 17 of the latch 16, flexing the spring arm 15 downwardly, until said lower end of the latch arms swings free of the element 16, whereupon said element will be moved abruptly upwardly by reason of the inherent spring of the arm 15, in the manner as is shown in the Figure 3, thereby latching or removably securing the latch arm 10 at the extreme of its inward movement impar,ed thereto from the device 12. With this inward movement of the lower end of the latch arm 10, it will be seen upon reference to the Figures 1 and 3 that the pawl carrying portion thereof will cause said pawl 14 to be moved outwardly from the teeth of the cam latch 6′, hence, permitting free or uninterrupted rotation of the same together with the sleeve 6 and by consequence, allowing of free rotary movement of the driving pulley 5 from the spring drum 3 and the wire belt 4.

To release the latch arm 10 from its innermost adjusted position, an eccentrically mounted disc 19 is provided, said disc being carried upon a shaft 19′ mounted in suitable bearing in a portion of the section 2 and having a handle device 19a fixed to its outer end so that rotary mo ion may be imparted to said disc. Thus, with rotation of the disc from that position shown in the Figure 3 to that position shown in the Figure 4, it will be seen that the outer extremity of the spring arm 15 will be flexed downwardly for a distance sufficient to allow disengagement of the latching element 16 from the lower end of the arm 10, thereby permitting said latch arm 10 to be returned to its normal position under urge or influence of the previously compressed coiled spring 13′ engaged with the inner end of the guide pin 13.

As will be seen upon reference to the Figure 2, the section 2 is provided with a removable partition or wall 2′ adapted to be releasably secured within the section 2 by means of screws or other fastening devices engaged therethrough and anchored in right angular brackets 2a secured within said section 2.

In the opposite or remaining section 1, the camera proper C is arranged and to permit of the proper arrangement of the film strip with respect to the lens of said camera and the feeding or movement of said strip by said lens whereby to effect the photographing of motion or still pictures thereby, I arrange the usual film feeding sprockets s, each of these sprockets having shaft extensions upon certain of the ends thereof which, as will be noted upon reference to the Figure 6 are mounted in suitable bearings provided therefor in the outer wall of the section 1 and in a partition or wall 1′ fixedly arranged within said section 1. Gears 20 are fixedly mounted upon the shaft extensions of each of these sprockets s and mesh with gears 20′ which in turn mesh with a connecting and larger gear 22 mounted upon a suitable shaft 21 journaled in bearings in said wall of the section 1 and the partition wall 1′ thereon; one of the sprockets s, preferably, the upper one thereof as is shown in the Figure 5, being formed with a key socket 8 into which the shaft extension 7 of the sleeve 6 is adapted to be engaged whereby to effect a driving connection between the two. Another gear 20a is journaled in bearings in the lower portion of the section 1 and meshes with the adjacent gear 20′; this gear 20a being adapted to be driven from a pinion 20b meshing therewith and having a key socket formed in the same to permit of the introduction of a crank or similar manually operable device therein whereby to permit of the manual operation or rotation of the film feeding sprockets s.

Remote control means are provided for the film feeding mechanism of the camera, such control means consisting of a pinion 23 mounted upon a shaft journaled in bearings between the wall of the section 1 and the partition wall 1′, said pinion being adapted to mesh with the gear 22 and to have a key sprocket formed in the outer end thereof whereby to permit of the securing of a latch device consisting of a substantially rectangularly shaped body 25 thereto, this connection being preferably effected by the passing of a screw 25′ through said latching device 25 into the key socket of the shaft 24 of the pinion 23.

Mounted for pivotal movement upon a bearing screw 26 upon the outer side of the wall of the section 1 is a latch arm 27 having the upper end thereof engaged by a flexible connection 28 of suitable length; the intermediate portion of the latch arm 27 being formed with an opening 29 adapted, at times, to receive the screw 30 therethrough whereby said latch arm may be secured in a disengaged position with respect to the latch head 25, that is, by fastening said screw 30 through the opening 29 into engagement with a screw threaded opening formed in an adjacent portion of the wall of the section 1. By reason of this latch arm 27 and the normal engagement of the same with the latch head 25, it will be understood that rotation of the gear 22 and consequently the film feeding sprockets s may be positively controlled although when it is desired to render said latch arm 27 inactive, same is secured in that disengaged position through the medium of the screw 30 as is shown in the Figure 8.

In operation of my improved camera and assuming that the sections 1 and 2 are assembled in the manner hereinbefore stated, rotary motion may be transmitted to the film feeding sprockets s by thrusting the device 12 inwardly, thereby disengaging the pawl 14 from the cam latch 6′ and at the same time, securing said latch arm 10 in its disengaged positon by reason of the riding of the lower end thereof over and by the latch element 16 carried upon the spring arm 15. At this time, the spring drum 3 will be permitted to rotate and rotary motion will be transmitted therefrom to the driving pulley 5 through the medium of the wire belt 4 from whence such motion will be transmitted by way of the gear 5′ to the gear 6a and then through the shaft extension 7 of the sleeve 6 to the upper film feeding sprocket s having the key way or socket 8 formed in the same.

Rotary motion will be then transmitted from the upper sprocket s by way of the gear or pinion 20 to the gear 20′ then to the gear 22 and to the lower gear 20′ and finally to the lower sprocket s through its particular gear or pinion 20, hence, causing a film strip engaged over said sprocket s to be moved, in the proper manner by the lens of the camera C. This movement of the film strip will permit of the photographing of motion pictures with the camera C.

When it is desired to interrupt the transmission of rotary motion to the sprocket wheel s from the driving mechanism provided therefor, the handle 19a is turned so as to effect rotation of the disc 19 to that position as is shown in the Figure 4, thereby flexing the spring arm 15 and disengaging the latching element 13 from the lower end of the latch arm 10, permitting said latch arm 10 to return under influence of the coiled spring 13′ to its normal position and in so doing, reengaging the pawl 14 with an adjacent tooth of the cam latch 6′.

Should a user desire to photograph still pictures with the camera, this may be readily effected by disengaging the shaft extension 7 from the key socket 8 of the upper sprocket s, connecting a crank with the pinion 20b and then imparting the desired rotary motion to said pinion and from the pinion through the train of gears 20, 20′ and 22 through the film feeding strip, causing said strip to be shifted or moved in the desired manner by and before the lens of the camera C. Also, it will be understood that manual operation of the film feeding sprockets s may be effected in the same way for the photographing of motion pictures with the camera C, a crank (not shown) being rotated for the required period of time.

Under certain conditions, it is desirable that the camera user may wish to become the photographed subject and in such an instance, the remote control device consisting of the latch arm 27 and the latch head 25 are employed, during which period the shaft extension 7 is engaged in the key socket 8 of the upper film feeding sprocket s. For this remote control of the camera, a cord or other flexible connection 28 of the required length is employed and inasmuch as one end of said cord is connected to the free end of the latch arm 27, it will be understood that the subject when properly positioned before the camera lens need only pull the cord 28 to effect the transmission of rotary motion to the film feeding sprocket *s* for causing the film strip to be intermittently or otherwise properly fed before and by the camera lens that the desired exposure may be effected. With the pulling of the cord 28 in a direction to disengage the free end of the latch arm 27 from the latch head 25, said latch head 25 will be free to rotate with the pinion 23 carrying the same and consequently thereupon, an uninterrupted rotary movement of the train of gears 20, 20' and 22 will be permitted. To interrupt or stop the transmission of rotary movement to the film feeding sprockets *s*, the cord 28 is released whereupon the latch arm 27 will return to its normal position as is shown in the Figure 7 under influence of a spring means engaged therewith, hence, preventing further passage of the film strip by the camera lens and at the same time, interrupting the photographing exposures.

From the foregoing, it will be apparent that the control mechanism which is actuated by the finger thrust device or knob 12, can be brought into play for controlling the operation of the film feeding mechanism only when the latch member 27 is released or in the position as better illustrated in Figure 8 of the drawings. Likewise in order to permit the remote control means to be brought into play, it is absolutely necessary that the motor mechanism be connected to the film feeding mechanism and the selective control mechanism which is operable by the knob 12 be placed in its inactive position as is better illustrated in Figure 3. Whereas, the means local to the camera, that is, the latch arm 10, can only be operated upon an inward thrust upon the knob 12 in order to control the film feeding mechanism. I provide a second film feeding mechanism control device comprising the latch arm 27 which can be operated in order to release such control device at a point remote from the camera. Therefore, to operate the camera at a distant point or at a place whereat the operator may take his own picture a string or other flexible member indicated by the numeral 28 may be attached to this arm or lever 27 so that when a pull is exerted upon this flexible member, the latch arm 27 may be operated or moved to the position as is better illustrated in Figure 8 in order to release the control means then employed for the film feeding mechanism.

Manifestly, the construction shown is capable of considerable modification and such modification as is within the scope of my claims, I consider within the spirit of my invention.

I claim:

1. In combination, a camera, means for feeding a film strip by the camera lens, means local to the camera for controlling the operation of said first means, other means operable from a point remote to the camera for controlling operation of said first means and means for retaining either of said controlling means in inactive position.

2. In combination, a camera, means for feeding a film strip by the camera lens, means local to the camera for controlling the operation of said first means, other means operable from a point remote to the camera for controlling operation of said first means, and means for retaining the local or remote means in inoperative position while the other of said means is in its operative position.

3. In combination, a camera, means for feeding a film strip by the camera lens, means for imparting motion to said first mentioned means, means for controlling the operation of said second mentioned means, a latch device included in said controlling means, a latch arm cooperating with said latch device, means extending at a point remote from the camera and connected to said latch arm whereby the latter may be manually operated, and means for retaining said arm in an inactive position.

4. A moving picture camera comprising in combination a casing, a film feeding mechanism arranged in said casing, means for imparting rotary motion to said film feeding mechanism, a control device for said means for imparting motion to the film feeding mechanism, means for retaining said control device in an inactive position, remote control means operatively connected with said film feed mechanism, a cord included in said remote control means whereby the film feed mechanism of the camera may be controlled at a point remote from the camera when said control device for the means for imparting rotary motion to the film feeding means is retained in an inactive position.

5. A moving picture camera comprising in combination a casing, a film feeding mechanism arranged within said casing, a spring control motor arranged within said casing and operatively connected to said film feeding mechanism, a cam latch arranged within said casing and operatively connected to said spring motor, a latch arm pivotally mounted within said casing adapted to engage with said cam latch, a knob connected to said latch arm and extending exteriorly of said casing, a guide pin for said latch arm, a latch element adapted to retain said latch arm in an inactive position, an eccentrically mounted disk arranged within said casing and adapted to engage said latch element whereby said latch arm at times may be released, and a handle extending exteriorly of said casing and connected to said eccentrically mounted disk.

6. A moving picture camera comprising in combination a casing, film feeding means arranged within said casing, a lever pivoted exteriorly of said casing and normally in engagement with said film feeding means for preventing actuation of the latter, a cord connected to said lever and adapted to exert a direct pull thereon for moving said pivoted lever out of engagement with the film feeding means to permit actuation thereof, and means between the casing and lever for locking the latter in disengaged position with respect to the film feeding means.

In testimony whereof I affix my signature.

DR. EMANUEL GOLDBERG.